United States Patent
Ruayana et al.

(10) Patent No.: US 12,255,446 B2
(45) Date of Patent: Mar. 18, 2025

(54) CABLE RETAINER AND METHOD

(71) Applicant: Lear Corporation, Southfield, MI (US)

(72) Inventors: Jun Roz Ruayana, Novi, MI (US); Erwin Baga-an, Cebu (PH); John Montgomery, Canton, MI (US); William Bond, Livonia, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/741,950

(22) Filed: May 11, 2022

(65) Prior Publication Data

US 2023/0369839 A1   Nov. 16, 2023

(51) Int. Cl.
  *H02G 3/30*   (2006.01)
  *F16L 3/00*   (2006.01)
  *F16L 3/12*   (2006.01)
  *H02G 3/32*   (2006.01)
  *F16B 21/08*  (2006.01)

(52) U.S. Cl.
  CPC .............. *H02G 3/32* (2013.01); *H02G 3/24* (2013.01); *F16B 21/08* (2013.01); *F16L 3/12* (2013.01)

(58) Field of Classification Search
  CPC .. H02G 3/32; H02G 3/24; H02G 3/36; H02G 3/00; F16L 3/00
  See application file for complete search history.

(56) References Cited

U.S. PATENT DOCUMENTS

| | | | |
|---|---|---|---|
| 3,029,486 A * | 4/1962 | Raymond | F16B 21/086 |
| | | | 411/908 |
| 3,860,999 A * | 1/1975 | Meyer | F16B 21/08 |
| | | | 411/510 |
| 4,918,261 A | 4/1990 | Takahashi et al. | |
| 5,689,863 A | 11/1997 | Sinozaki | |
| 5,806,812 A | 9/1998 | Jacobs et al. | |
| 5,829,722 A * | 11/1998 | Igarashi | H05K 7/142 |
| | | | 248/222.12 |
| 5,929,382 A | 7/1999 | Moore et al. | |
| 5,932,846 A | 8/1999 | Zaguskin et al. | |
| 6,561,465 B2 | 5/2003 | Kondo | |
| 6,572,317 B2 | 6/2003 | Okada et al. | |
| 6,669,426 B1 | 12/2003 | Detter et al. | |

(Continued)

FOREIGN PATENT DOCUMENTS

| | | |
|---|---|---|
| DE | 10315316 A1 | 10/2004 |
| DE | 202015003578 U1 | 5/2016 |

(Continued)

*Primary Examiner* — Tan Le
(74) *Attorney, Agent, or Firm* — Fishman Stewart PLLC

(57) ABSTRACT

A method of connecting a cable with a cable retainer may include forming a hole into a flat cable, forming a first slit into the flat cable, and/or forming a second slit into the flat cable. The first slit, the second slit, and/or the hole may define an opening. A cable retainer may include a base, a first portion connected to the base and having a first length, and/or a second portion connected to the first portion having a second length that may be greater than the first length. The method may include inserting an edge of the second portion into the opening at an oblique or right angle relative to the flat cable, and/or positioning the cable retainer such that the first portion is partially disposed in the hole and a portion of the flat cable is disposed between the base and the second portion.

11 Claims, 17 Drawing Sheets

(56) References Cited

U.S. PATENT DOCUMENTS

| | | | |
|---|---|---|---|
| 7,301,101 B2 * | 11/2007 | Suzuki | B60R 16/0215 |
| | | | 174/72 A |
| D589,333 S | 3/2009 | Nakazato | |
| 7,753,634 B2 | 7/2010 | Nakazato | |
| 7,927,050 B2 | 4/2011 | Koike | |
| 8,028,962 B2 | 10/2011 | Geiger | |
| 8,177,173 B2 | 5/2012 | Spiess | |
| 8,393,058 B2 | 3/2013 | Okada et al. | |
| 8,495,802 B2 | 7/2013 | Okada et al. | |
| 8,511,631 B2 | 8/2013 | Kato et al. | |
| 8,591,160 B2 | 11/2013 | Shinozaki | |
| 8,636,454 B2 | 1/2014 | Okada et al. | |
| D779,314 S | 2/2017 | Adams | |
| 9,982,700 B2 | 5/2018 | Najima | |
| D822,476 S | 7/2018 | Haftarski et al. | |
| D840,799 S | 2/2019 | Haftarski et al. | |
| D889,253 S | 7/2020 | Makino et al. | |
| 2001/0010349 A1 | 8/2001 | Sakakura | |
| 2006/0099051 A1 * | 5/2006 | Moerke | F16B 19/008 |
| | | | 411/508 |
| 2012/0217355 A1 | 8/2012 | Geiger et al. | |
| 2019/0331258 A1 | 10/2019 | Geiger et al. | |

FOREIGN PATENT DOCUMENTS

| | | | | |
|---|---|---|---|---|
| JP | 863240307 A | 10/1988 | | |
| JP | 107274357 A | 10/1995 | | |
| JP | 2004104964 A | 4/2004 | | |
| KR | 200478422 Y1 | 10/2015 | | |
| WO | WO-2013177108 A1 * | 11/2013 | | B29C 65/66 |

\* cited by examiner

CABLE RETAINER AND METHOD

TECHNICAL FIELD

The present disclosure generally relates to cable retainers for connecting flat cables to external objects, such as cable retainers that may, for example, be utilized in connection with and/or incorporated into vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some cable retainers may not provide sufficient functionality. Some cable retainers may not be configured to connect flat cables to external objects, may be expensive, and/or may be difficult to manufacture.

There is a desire for solutions/options that minimize or eliminate one or more challenges or shortcomings of cable retainers. The foregoing discussion is intended only to illustrate examples of the present field and is not a disavowal of scope.

SUMMARY

In embodiments, a cable retainer may include a base having a fastener, a first portion connected to the base and having a first length, a second portion connected to the first portion and having a second length that may be greater than the first length. A method of connecting a cable retainer may include forming a hole in a flat cable, forming a first slit into the flat cable, and/or forming a second slit into the flat cable. The first slit, the second slit, and/or the hole may define, at least in part, an opening that may have an opening length that may be greater than the second length. The method may include inserting an edge or other portion of the second portion into the opening at an oblique or right angle relative to the flat cable, and/or positioning the cable retainer such that the first portion is partially disposed in the hole and a portion of the flat cable is disposed between the base and the second portion.

With embodiments, a cable retainer for connecting a flat cable to an external object may include a base having a fastener, a first portion connected to the base, and/or a second portion connected to the first portion. The first portion may have a first length. The second portion may have a second length that is greater than the first length. The first portion and the second portion may at least partially define a recess configured to receive a portion of said flat cable.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Figure 1:
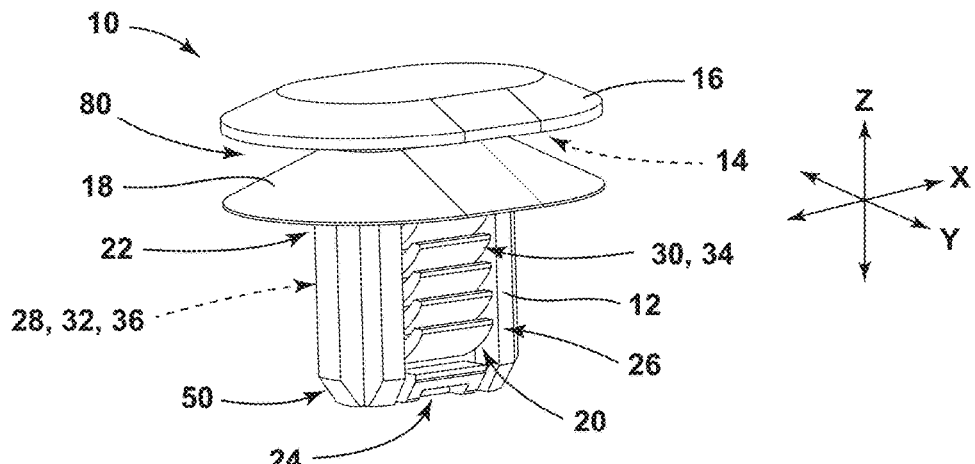
FIG. 1 is a perspective view generally illustrating an embodiment of a cable retainer according to teachings of the present disclosure.

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

In embodiments, such as generally illustrated in FIGS. 1-4, a cable retainer 10 may include a base 12, a first portion 14, and/or a second portion 16. The cable retainer 10 may be configured to connect a cable 200 (e.g., a flat flexible cable) to an external object 300 (see, e.g., FIG. 7B). An external object 300 may, for example and without limitation, include a surface, a portion, and/or a component of a vehicle 302, such as vehicle floor, a vehicle ceiling, and/or a vehicle panel, or a non-vehicle component, among others.

With embodiments, a base 12 may include a fastener 20. The fastener 20 may be configured for connection with an external object 300. In some example configurations, the base 12 may include a first end 22, a second end 24 spaced from the first end 22, a first side 26 disposed between the first end 22 and the second end 24, and/or a second side 28 spaced apart from the first side 26. The fastener 20 may include a first fastening section 30 and/or a second fastening section 32. The first fastening section 30 may extend from the first side 26 of the base 12, and/or the second fastening section 32 may extend from the second side 28 of the base 12 (see, e.g., FIG. 3).

In embodiments, the first fastening section 30 may include a plurality of first projections 34, and/or the second fastening section 32 may include a plurality of second projections 36. The first projections 34 and/or the second projections 36 may be configured to engage a portion of an external object 300, such as to connect the cable retainer 10 to the external object 300. The first projections 34 may be spaced apart relative to one another (e.g., in a Z-direction) along the first side 26 of the base 12 and/or the second projections 36 may be spaced apart relative to one another (e.g., in a Z-direction) along the second side 28 of the base 12. For example and without limitation, the first projections 34 and the second projections 36 may each include five projections. In some examples, the first projections 34 and/or the second projections 36 may include more or less than five projections. In some configurations, one or more projections 34, 36 may overlap with each other, at least to some degree. For example, a first end of a projection, which may be connected to a side 26, 28, may be aligned, in a Z-direction, between ends of an adjacent projection.

Figure 2:
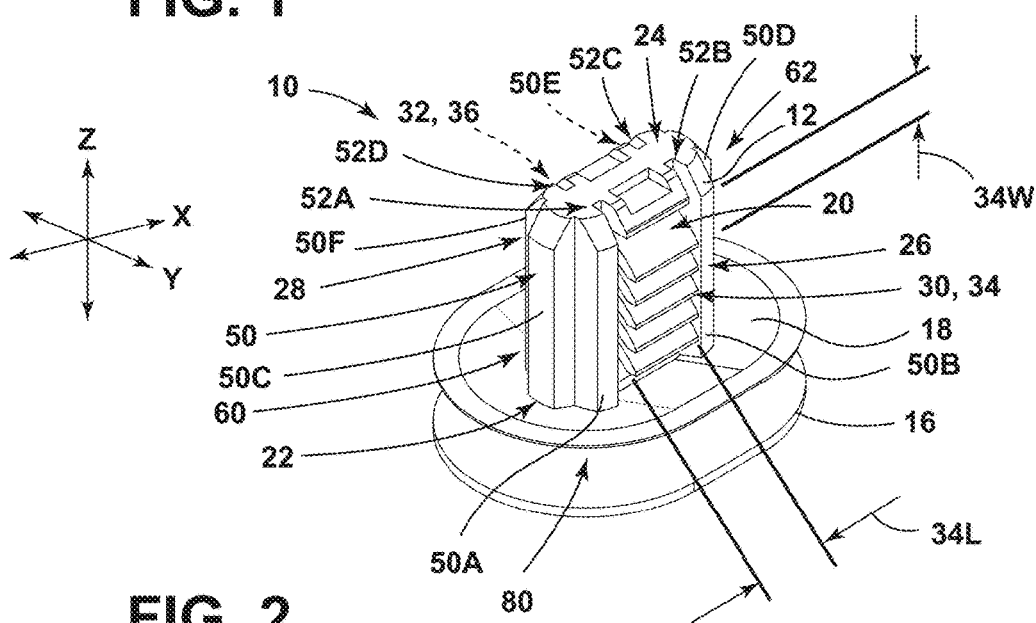
FIG. 2 is a perspective view generally illustrating an embodiment of a cable retainer according to teachings of the present disclosure.

With embodiments, a projection (e.g., of the first projections 34 and/or the second projections 36) may include a width 34W and a length 34L (see, e.g., FIG. 2). The length 34L of the projection (e.g., in an X-direction) may be larger than the width 34W (e.g., in a Y-direction) of the projection. In some examples, the length 34L may be approximately double the width 34W. In some instances, the length 34L may be substantially equal to or smaller the width 34W.

Figure 3:
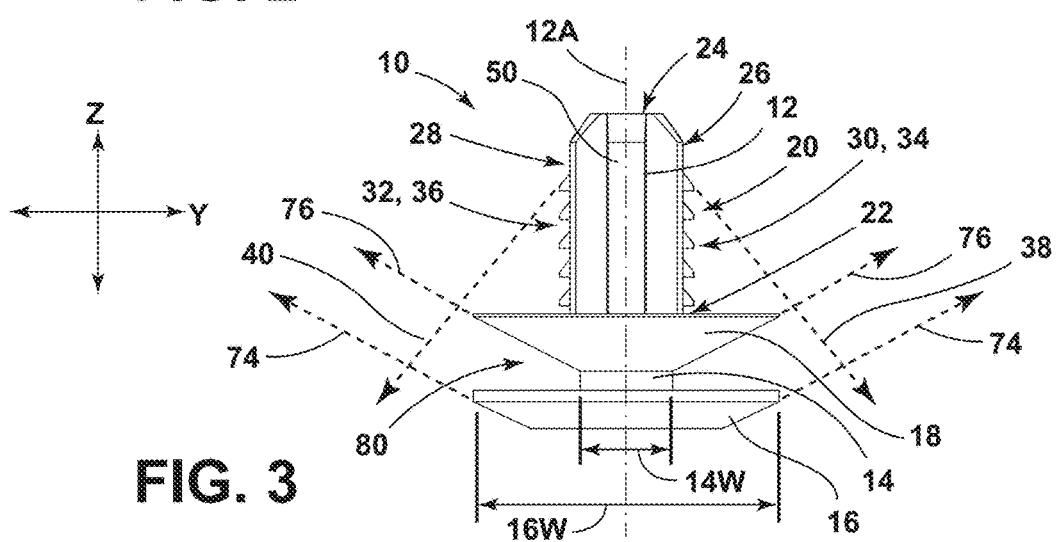
FIG. 3 is a side view generally illustrating an embodiment of a cable retainer according to teachings of the present disclosure.

In embodiments, such as generally illustrated in FIG. 3, one or more first projections 34 may extend in a first direction 38 relative to an axis 12A of the base 12, and/or one or more second projections 36 may extend in a second direction 40 relative to the axis 12A. For example and without limitation, the first and second projections 34, 36 may be mirrored version of each other relative to center of the cable retainer 10. Angles of the first direction 38 and the second direction 40 relative to an axis 12A of the cable retainer 10 may be configured to facilitate insertion of the fastener 20 into a hole 304 of an external object 300.

With embodiments, the base 12 may include a plurality of tracks 50, such as a first track 50A, a second track 50B, a third track 50C, a fourth track 50D, a fifth track 50E, and/or a sixth track 50F (see, e.g., FIG. 2). The tracks 50 may be configured to engage corresponding voids of the external object 300, such as to facilitate the alignment and/or connection of the cable retainer 10 with the external object 300. The tracks 50 may extend from the first end 22 to the second end 24 of the base 12. In some examples, the tracks 50 may include tapered ends that may be disposed proximate the second end 24 of the base 12.

In embodiments, the first track 50A and the second track 50B may be disposed on the first side 26 of base 12. The first projections 34 may be disposed between the first track 50A and the second track 50B. The first projections 34 may be spaced apart from the first track 50A via a first void 52A that may extend along the first side 26 (e.g., in a Z-direction), and/or the first projections 34 may be spaced apart from the second track 50B via a second void 52B that may extend along the first side 26 (e.g., in a Z-direction), such as in parallel with the first void 52A. The first void 52A and the second void 52B may extend from the first end 22 to the second end 24 of the base 12.

With embodiments, the third track 50C may be disposed on a third side 60 of the base 12, and/or the fourth track 50D may be disposed on a fourth side 62 of the base 12. The fifth track 50E and the sixth track 50F may be disposed on the second side 28 of base 12. The second projections 36 may be disposed between the fifth track 50E and the sixth track 50F. The second projections 36 may be spaced apart from the fifth track 50E via a third void 52C that may extend along the second side 28 (e.g., in a Z-direction), and/or the second projections 36 may be spaced apart from the sixth track 50F via a fourth void 52D that may extend along the second side 28 (e.g., in a Z-direction), such as in parallel with the third void 52C. The third void 52C and the fourth void 52D may extend from the first end 22 to the second end 24 of the base 12.

In embodiments, the first portion 14 and/or the second portion 16 of the cable retainer 10 may be disposed proximate the first end 22 of the base 12. In some example configurations, the first portion 14 may be connected to the base 12, and/or the second portion 16 may be connected to the first portion 14. The first portion 14 and/or the second portion 16 may, for example and without limitation, include shapes that are substantially oblong (e.g., a rectangular shape including curved ends) (see, e.g., FIGS. 1-5). In some instances, the first portion 14 and/or the second portion 16 may include shapes that are substantially circular (see, e.g., FIGS. 8-12 and 15-19), but may include other configurations.

Figure 4:
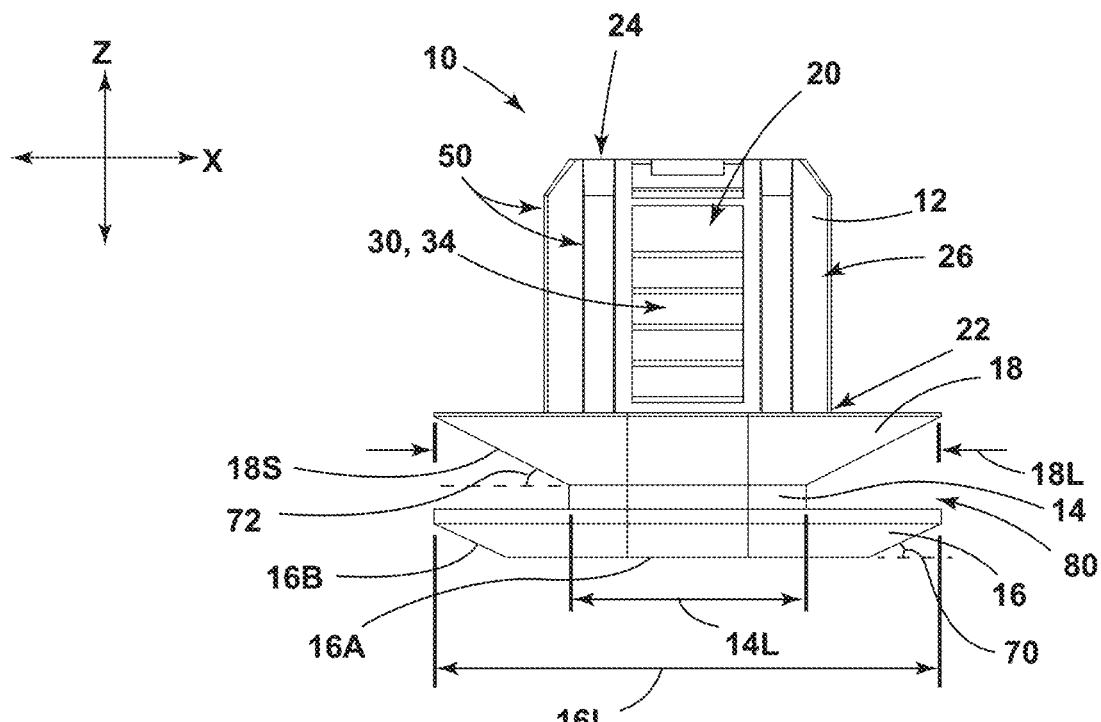
FIG. 4 is a front view generally illustrating an embodiment of a cable retainer according to teachings of the present disclosure.

With embodiments, a first portion 14 may include a length 14L (e.g., in an X-direction), and/or a second portion 16 may include a length 16L (see, e.g., FIG. 4). The first portion 14 may include a width 14W (e.g., in a Y-direction), and/or the second portion 16 may include a width 16W (see, e.g., FIG. 3). In some examples, the length 16L of the second portion 16 may be longer than the length 14L of the first portion 14, and/or the width 16W of the second portion 16 may be wider than the width 14W of the first portion 14.

Figure 5:
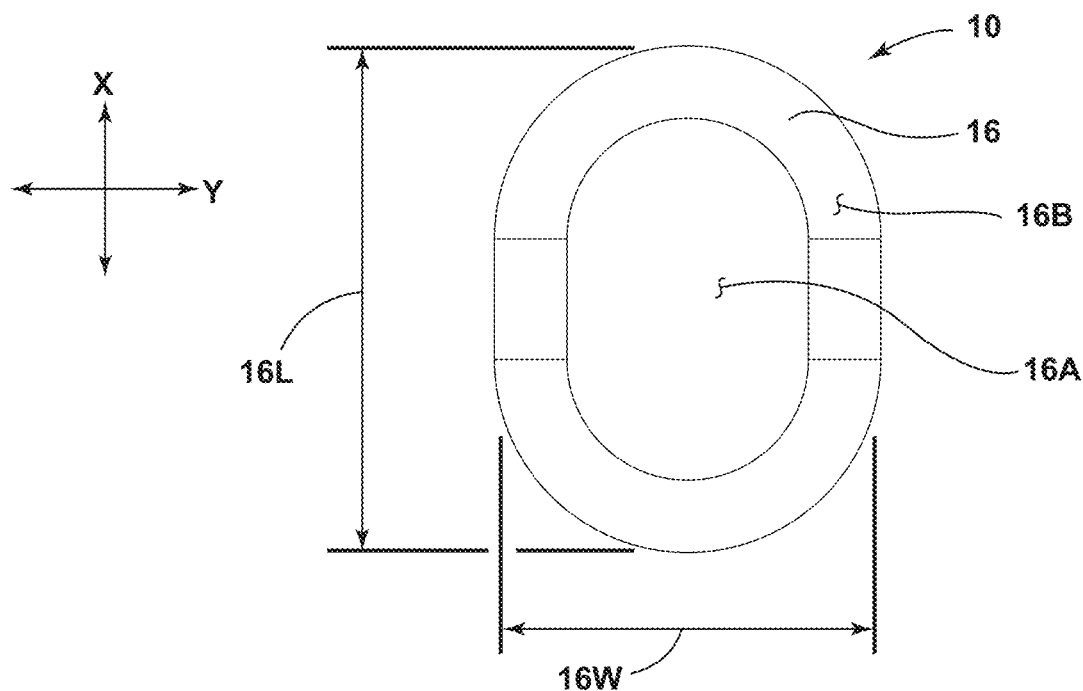
FIG. 5 is a top view generally illustrating an embodiment of a cable retainer according to teachings of the present disclosure.

In embodiments, such as generally illustrated in FIGS. 4 and 5, a second portion 16 may include an end surface 16A and a side surface 16B that extends (e.g., outwardly) from the end surface 16A. The side surface 16B may extend at an angle 70 (e.g., an acute angle) relative to the end surface 16A. In some example configurations, the angle 70 may be approximately 45 degrees.

With embodiments, a base 12 of a cable retainer 10 may include a flange 18 spaced apart from the second portion 16 (e.g., in a Z-direction). The first portion 14 may be disposed between the flange 18 and the second portion 16. The flange 18 may include a length 18L that is substantially similar to the length 16L of the second portion 16 (see, e.g., FIG. 4). The flange 18 may include an outer surface 18S that extends at an angle 72 (e.g., an acute angle) relative to the first portion 14.

In embodiments, such as generally illustrated in FIG. 3, the side surface 16B of the second portion 16 may extend in a third direction 74, and/or the outer surface 18S of the flange 18 may extend in a fourth direction 76. With embodiments, the third and fourth directions 74, 76 may intersect the first and second directions 38, 40 of the first and second projections 34, 36.

Figure 6A:
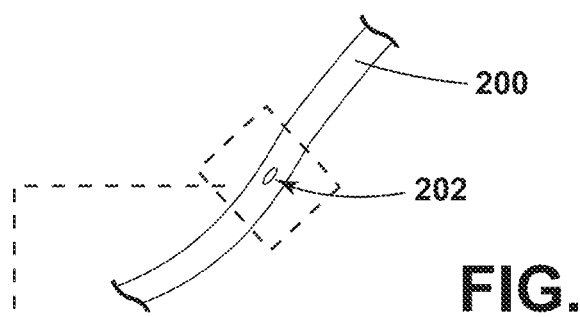
FIG. 6A is a partial top view generally illustrating an embodiment of a flat cable according to teachings of the present disclosure.
Figure 6B:
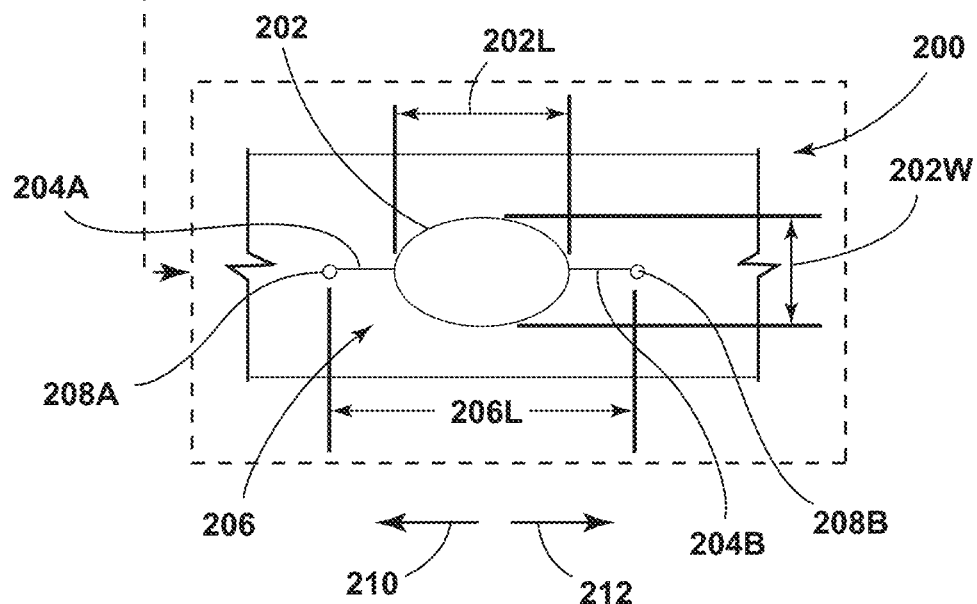
FIG. 6B is an enlarged portion of FIG. 6A.

With embodiments, such as generally illustrated in FIGS. 6A and 6B, a flat cable 200 may include a hole 202, a first slit 204A, and/or a second slit 204B. The first slit 204A and the second slit 204B may extend from opposing sides of the hole 202. For instance, the first slit 204A may extend in a first direction 210 and/or the second slit 204B may extend in a second direction 212. The first direction 210 may be opposite the second direction 212. The hole 202 may include a length 202L that may be approximately equal to or greater than the length 14L of the first portion 14 of the cable retainer 10, and/or may be less than a length 16L of the second portion 16. The hole 202 may include a width 202W that may be approximately equal to or greater than a width 14W of the first portion 14, and/or may be less than a width 16W of the second portion 16.

In embodiments, a cable retainer opening 206 may include the first slit 204A, the second slit 204B, and/or the hole 202. The opening 206 may include a length 206L that may be approximately equal to or greater than the length 16L of the second portion 16 of the cable retainer 10. In some example configurations, a first secondary hole 208A may be disposed at a distal end of the first slit 204A, and/or a second secondary hole 208B may be disposed at a distal end of the second slit 204B. The first secondary hole 208A and/or the second secondary hole 208B may be substantially smaller than the hole 202. For example and without limitation, areas of each of the secondary holes 208A, 208B may be 10% or less than an area of the hole 202. The first and second secondary holes 208A, 208B may be configured to limit and/or prevent lengths of the first and second slits 204A, 208B from increasing (e.g., to limit tearing of the cable 200), such as during connection with a cable retainer 10 and/or an external object 300.

Figure 7A:
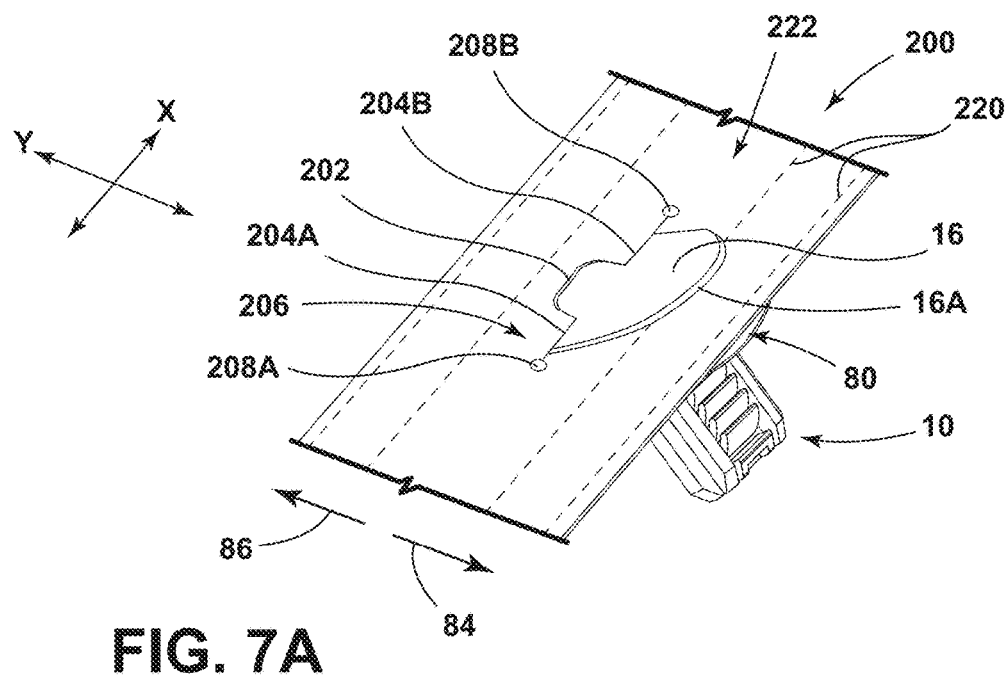
FIG. 7A is a partial perspective view generally illustrating an embodiment of a cable retainer being connected to a flat cable according to teachings of the present disclosure.
Figure 7B:
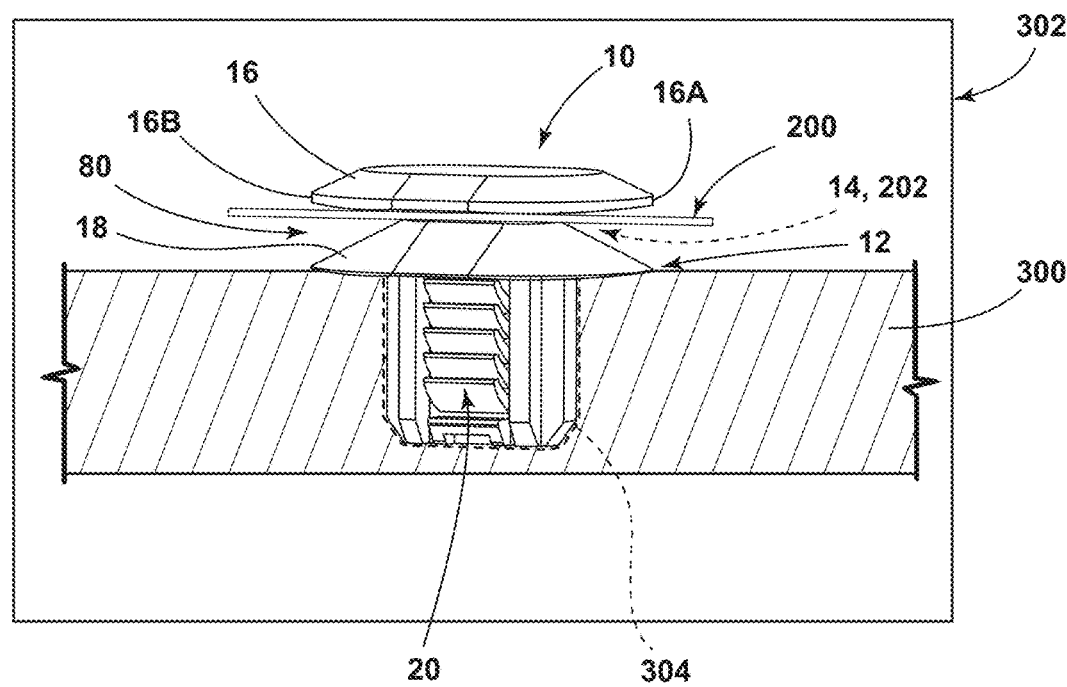
FIG. 7B is a partial cross-sectional perspective view generally illustrating an embodiment of a cable retainer connected to a flat cable and an external object according to teachings of the present disclosure.
Figure 8:
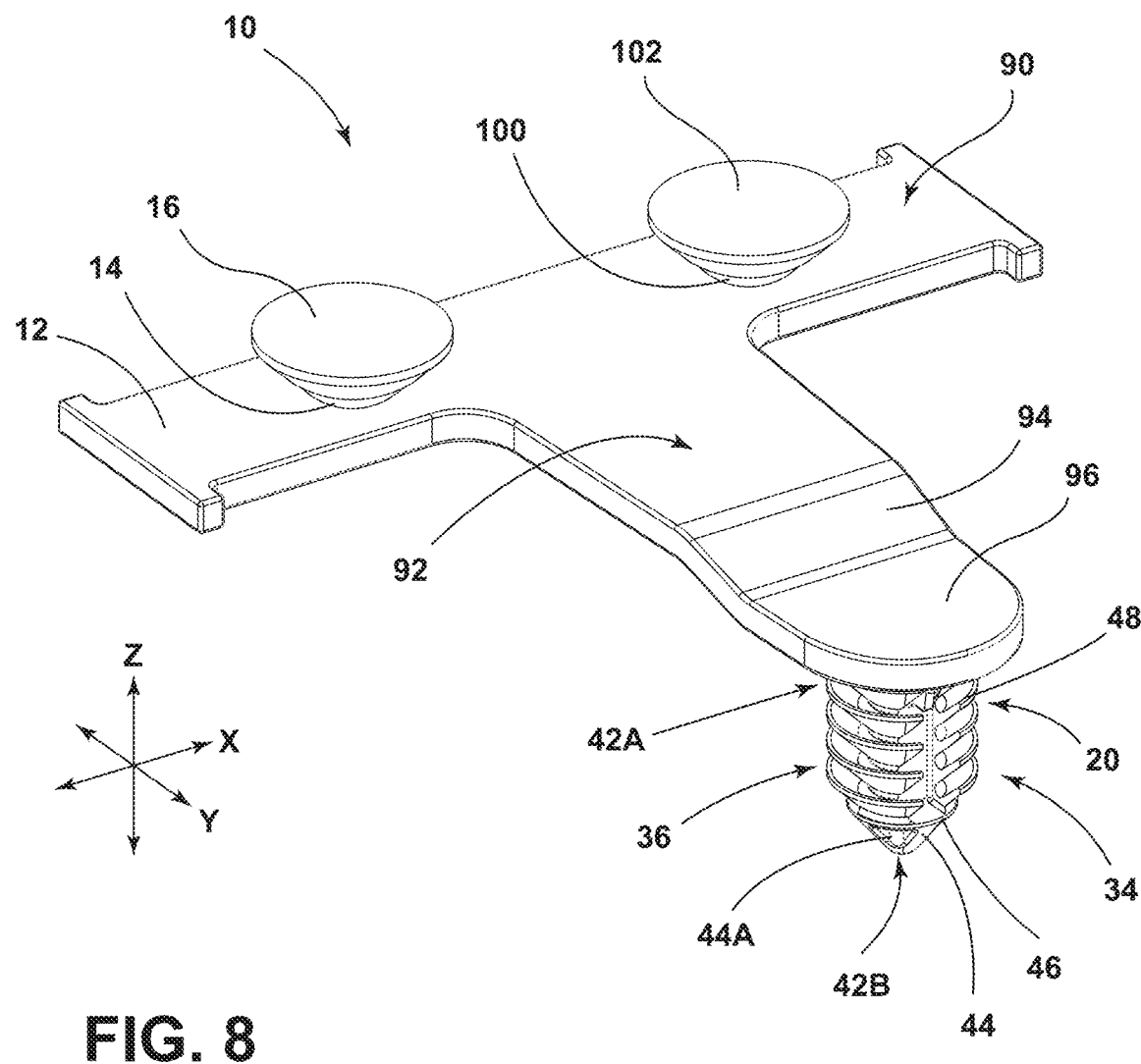
FIG. 8 is a perspective view generally illustrating an embodiment of a cable retainer according to teachings of the present disclosure.

With embodiments, such as generally illustrated in FIGS. 1-4, 7A, and 7B, a first portion 14 and a second portion 16 of the cable retainer 10 may at least partially define a recess 80. As generally illustrated in FIGS. 7A and 7B, the recess 80 may be configured to receive a portion of the flat cable 200. In some examples, the recess 80 may be defined, at least in part, by the first portion 14, the second portion 16, and/or the flange 18. In some instances, the recess 80 may be defined, at least in part, by the first portion 14, the second portion 16, and/or the base 12. In embodiments, such as generally illustrated in FIG. 7B, in an assembled configuration, the first portion 14 of the cable retainer 10 may be partially disposed within a hole 202 of a flat cable 200, and/or the flat cable 200 may be partially disposed between the second portion 16 and the flange 18. The cable retainer 10 may comprise one or more of a variety of materials. For example and without limitation, a cable retainer 10 may comprise one or more metal and/or plastic materials, among others.

In embodiments, such as generally illustrated in FIG. 7A, a flat cable 200 may include one or more electrical conductors 220 and/or insulating material 222 that may electrically insulate the conductors 220 from each other and/or other components. The one or more conductors 220 that may be disposed in parallel with each other and/or that may be substantially aligned with a common plane (e.g., an X-Y plane). The one or more conductors 220 may, in some configurations, be integrally formed with the insulating material 222. Some or all portions of an opening 206 may be disposed between (e.g., in a Y-direction) two conductors 220.

In embodiments, such as generally illustrated in FIGS. 8-12, a base 12 of a cable retainer 10 may include a first segment 90 and a second segment 92. The first segment 90 and the second segment 92 may be disposed in a T-shaped configuration. For example, the second segment 92 may extend orthogonally from the first segment 90. The second segment 92 may include a ramp portion 94 and/or an end portion 96. The end portion 96 may be disposed at a distal end of the second segment 92 and/or may be flat/planar. The ramp portion 94 may be disposed between the first segment 90 and the end portion 96. The ramp portion 94 may be disposed (e.g., angled) such that end portion 96 is offset from (e.g., disposed lower than) the first segment 90. In some example configurations, a fastener 20 may extend from the end portion 96.

With embodiments, a fastener 20 may include a first end 42A and a second end 42B spaced apart from the first end 42A. The first end 42A may be connected to the second segment 92 of the base 12. In some examples, the fastener 20 may include a cone portion 44. The cone portion 44 may be disposed proximate the second end 42B and may include a plurality of recesses 44A. The recesses 44A may, in some instances, receive a corresponding portion of an external object 300, such as to help facilitate the alignment and/or connection of the cable retainer 10 with the external object 300, and/or may reduce the weight of the cone portion 44.

In embodiments, the first projections 34 may be separated from the second projections 36 by one or more voids 46. The fastener 20 may include one or more attachment segments 48 (e.g., ribs) that may be received by corresponding formations of the external object 300, such as to help facilitate the alignment and/or connection of the cable retainer 10 with the external object 300. An attachment segment 48 may be disposed at least partially in a void 46 of the fastener 20, may extend from the first end 42A of the fastener 20, and/or may terminate before reaching the second end 42B of the fastener 20. In some configurations, the first and second projections 34, 36 may cooperate to provide a cone-like shape (e.g., a projection 34, 36 may include a shape that is similar to a section of half of a cone).

With embodiments, in some example configurations, a cable retainer 10 may include a third portion 100 and/or a fourth portion 102. The third portion 100 may be connected to the base 12, and/or the fourth portion 102 may be connected to the third portion 100. The third portion 100 may be substantially similar to the first portion 14, and/or the fourth portion 102 may be substantially similar to the second portion 16. For instance, the third portion 100 may include a length 100L that is substantially similar to the length 14L of the first portion 14, and/or the fourth portion 102 may include a length 102L that is substantially similar to the length 16L of the second portion 16 (see, e.g., FIG. 10). In some examples, the third portion 100 may be spaced apart from the first portion 14 along the first segment 90 of the base 12 (e.g., in a X-direction). The second portion 16 and/or the fourth portion 102 may include an end surface 16A, 102A and/or a side surface 16B, 102B that tapers inward toward the first portion 14 and/or the third portion 100.

Figure 10:
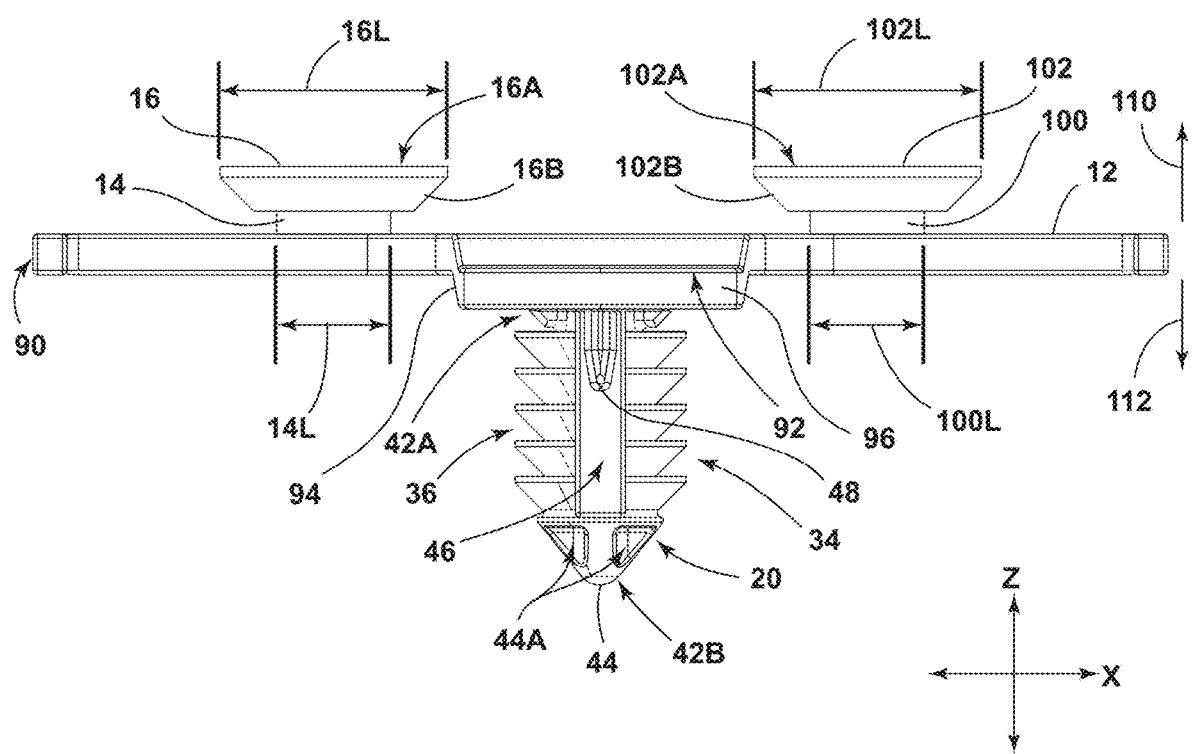
FIG. 10 is a front view generally illustrating an embodiment of a cable retainer according to teachings of the present disclosure.

In embodiments, such as generally illustrated in FIG. 10, the first portion 14 and/or the third portion 100 may extend from the base 12 in a first direction 110 (e.g., a first Z-direction) and/or the fastener 20 may extend from the base 12 in a second direction 112 (e.g., a second Z-direction). In some examples, the second direction 112 may be opposite the first direction 110. In some example configurations, centers of the first portion 14 and/or the third portion 100 may be offset from the fastener 20 by a distance 114 (see, e.g., FIG. 11).

Figure 9:
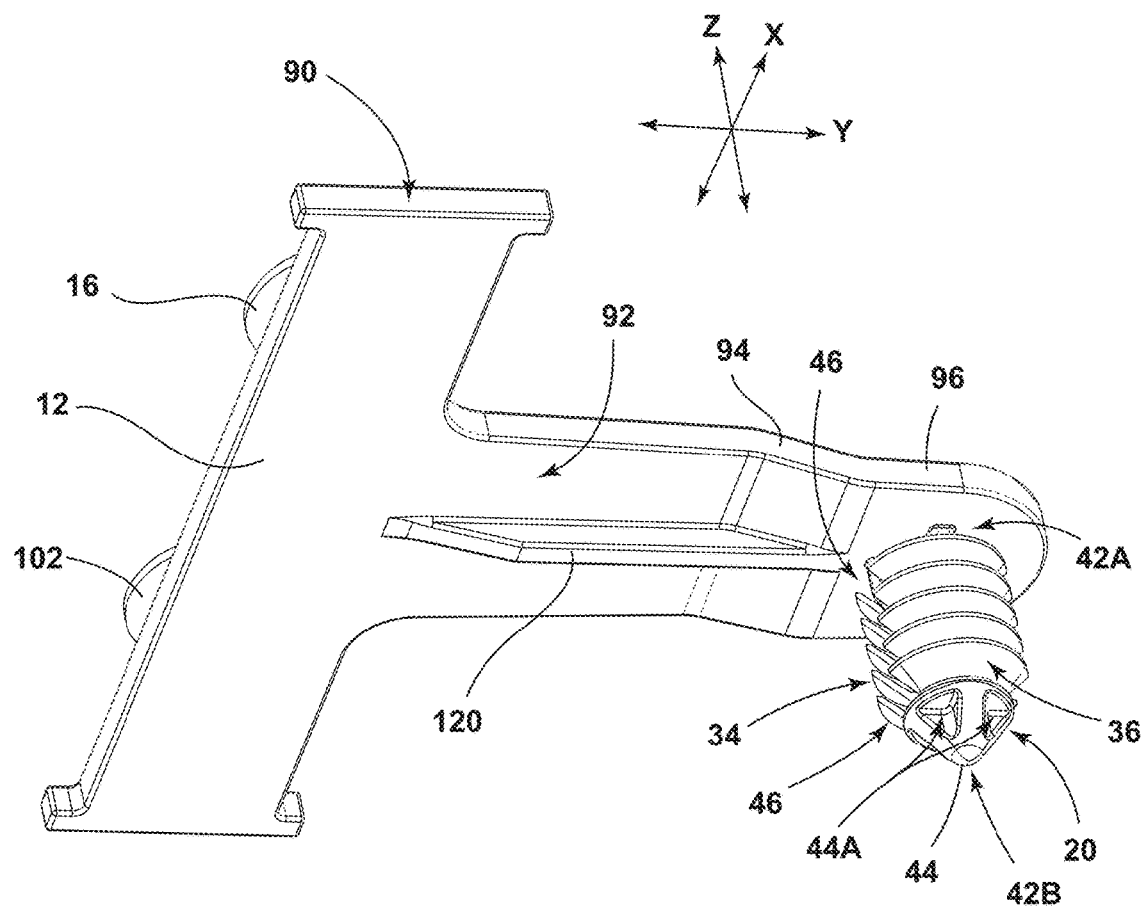
FIG. 9 is an additional perspective view generally illustrating an embodiment of a cable retainer according to teachings of the present disclosure.
Figure 11:
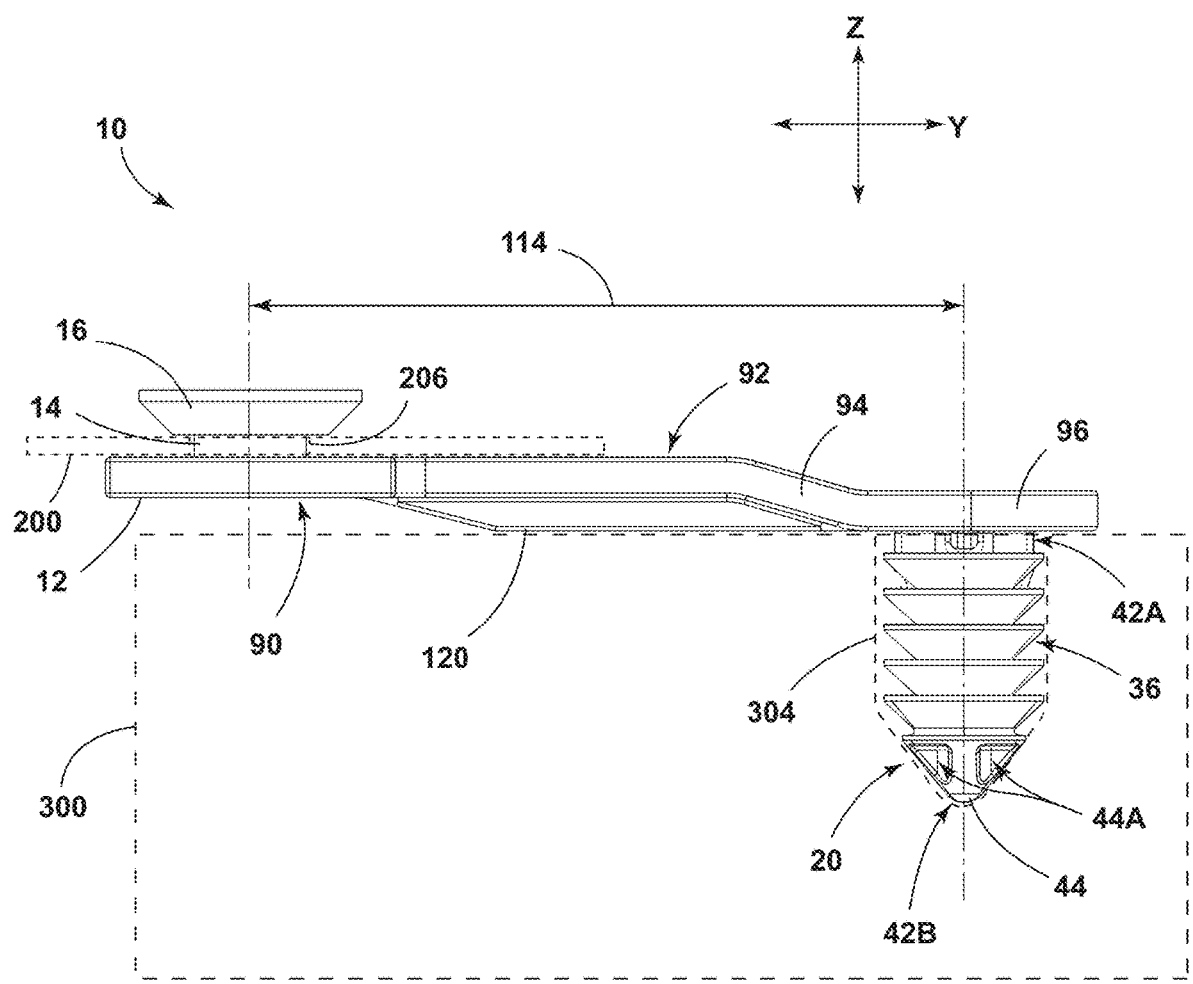
FIG. 11 is a side view generally illustrating an embodiment of a cable retainer according to teachings of the present disclosure.
Figure 12:
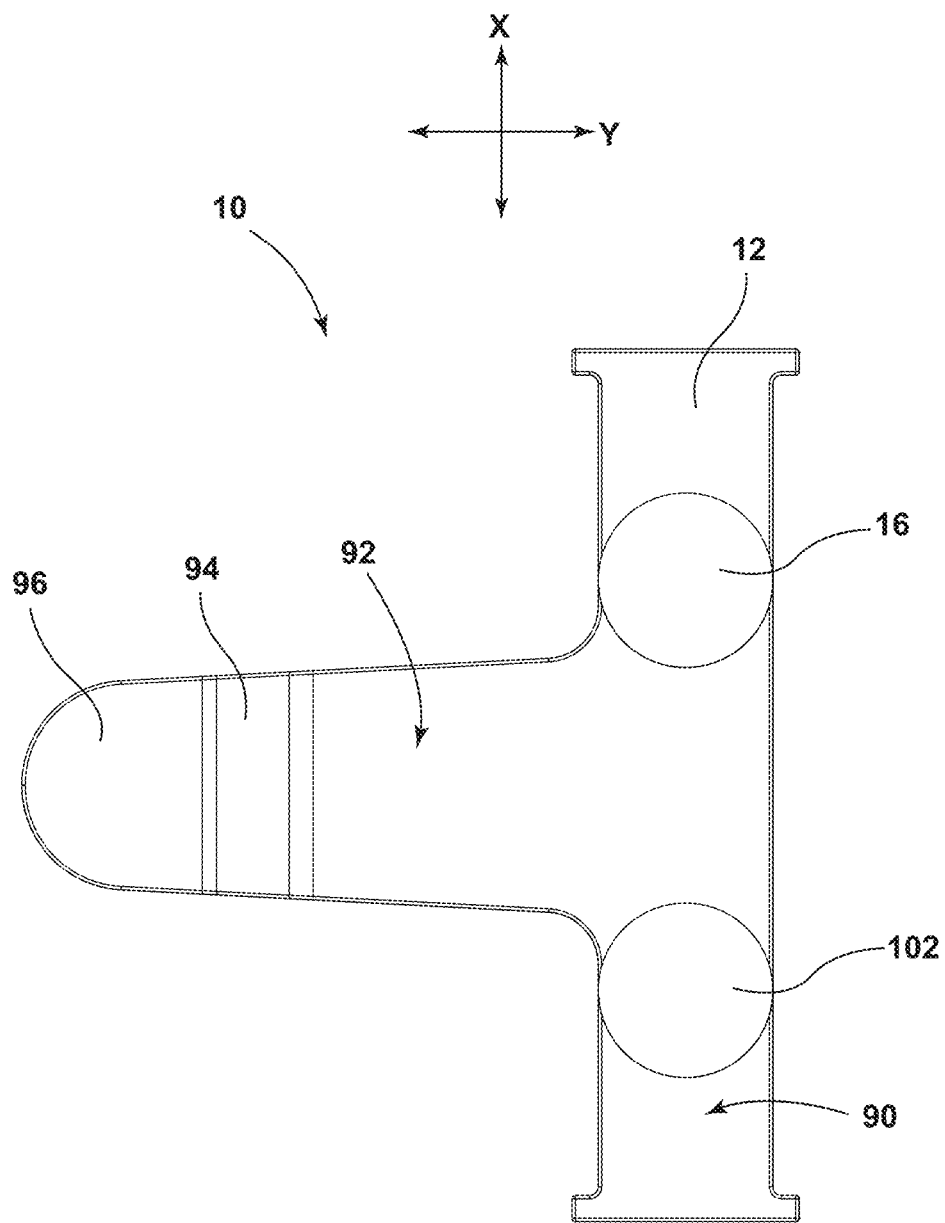
FIG. 12 is a top view generally illustrating an embodiment of a cable retainer according to teachings of the present disclosure.

With embodiments, such as generally illustrated in FIGS. 9 and 11, a base 12 may include a reinforcement rib 120. The reinforcement rib 120 may extend along part or all of the first segment 90 and/or the second segment 92. The reinforcement rib 120 may be disposed on the same side of base 12 as the fastener 20. For instance, the reinforcement rib 120 may extend from an end of the second segment 92 proximate the first segment 90 of the base 12 to a portion of the second segment 92 proximate the fastener 20. In some examples, the reinforcement rib 120 may be configured to add rigidity and/or strength to the cable retainer 10. In some instances, the rib 120 may be configured to operate as an assembly aid such as to help facilitate alignment of the cable retainer 10 to the external object 300. For example, the rib 120 may be received by a corresponding portion of a hole 304 of the external object 300.

Figure 13A:
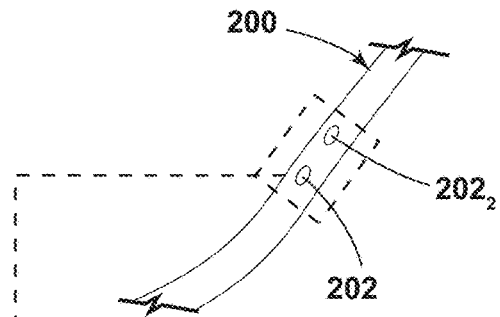
FIG. 13A is a partial top view generally illustrating an embodiment of a flat cable according to teachings of the present disclosure.
Figure 13B:
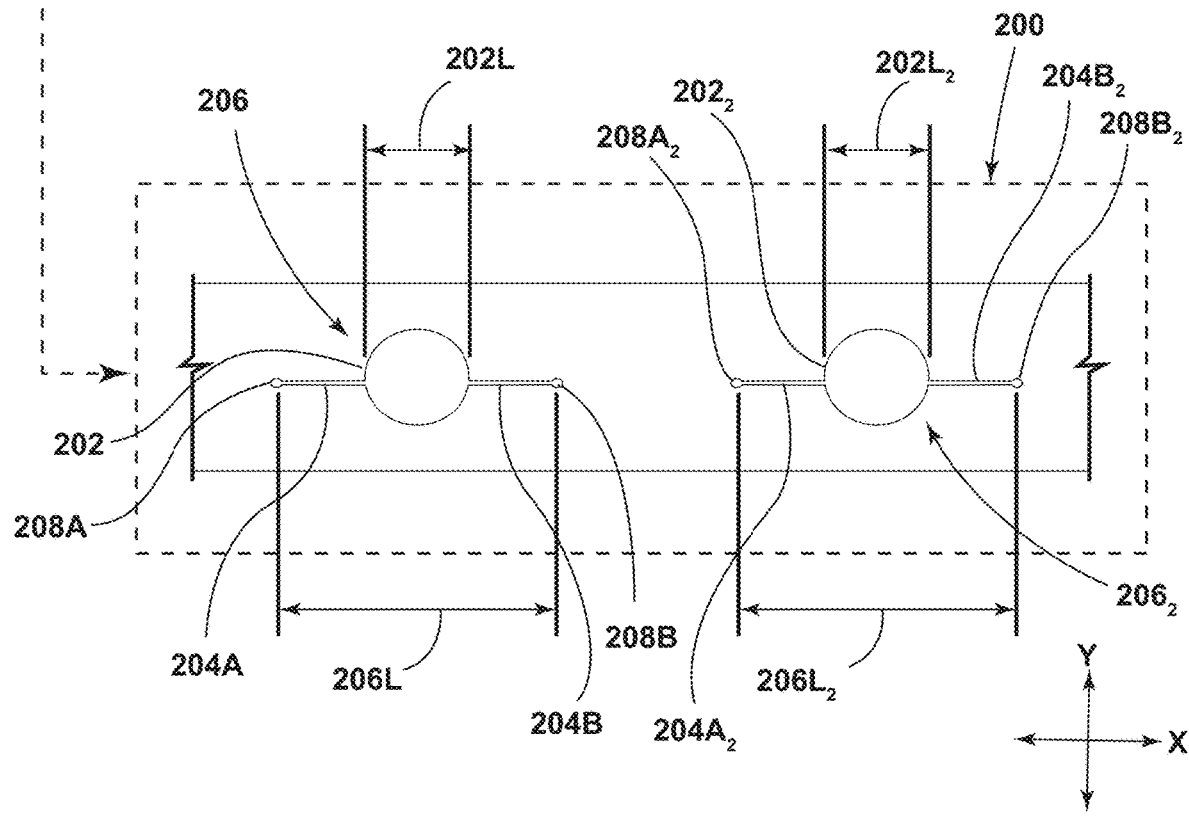
FIG. 13B an enlarged portion of FIG. 13A.

In embodiments, such as generally illustrated in FIGS. 13A and 13B, a flat cable 200 may include a first hole 202, a second hole $202_2$, a plurality of slits 204A, $204A_2$, 204B, $204B_2$, and/or a plurality of holes 208A, $208A_2$, 208B, $208B_2$. A first cable retainer opening 206 may include a first slit 204A, a second slit 204B, and/or a first hole 202. A second cable retainer opening $206_2$ may include a third slit $204A_2$, a fourth slit $204B_2$, and/or a second hole $202_2$. In some example configurations, the second hole $202_2$ may include a length $202L_2$ that may be approximately equal to or greater that the length 100L of the third portion 100 of the cable retainer 10. The second opening $206_2$ may include a length $206L_2$ that may be approximately equal to or greater than the length 102L of the fourth portion 102 of the cable retainer 10. For example, the openings 206, $206_2$ may be configured for the insertion of the second portion 16 and the fourth portion 102 (see, e.g., FIG. 14A).

Figure 14A:
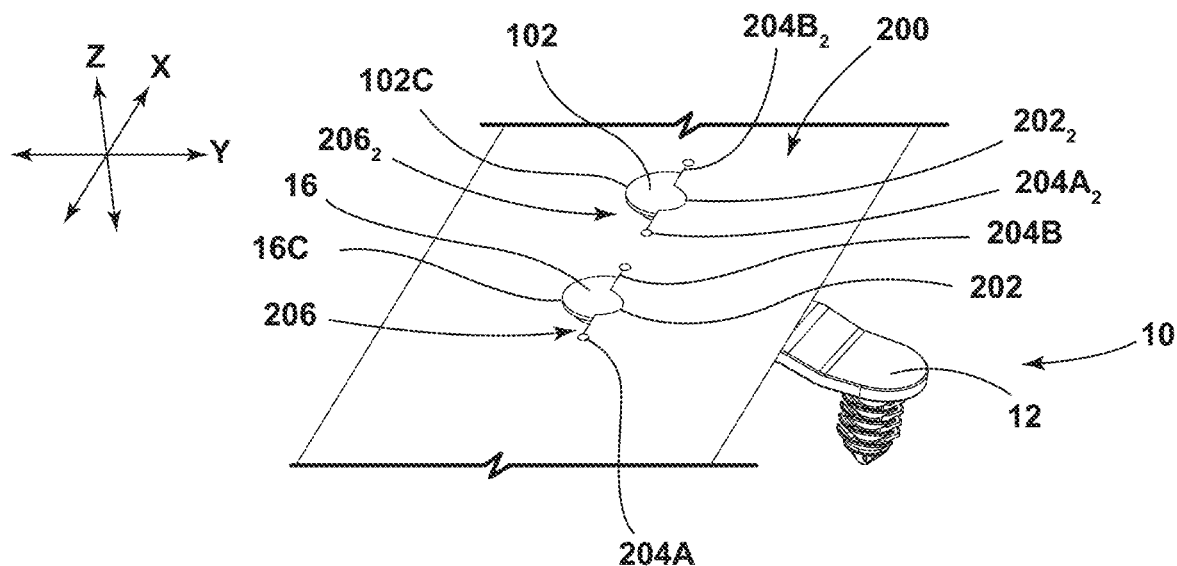
FIG. 14A is a partial perspective view generally illustrating an embodiment of a cable retainer being connected to a flat cable according to teachings of the present disclosure.
Figure 14B:
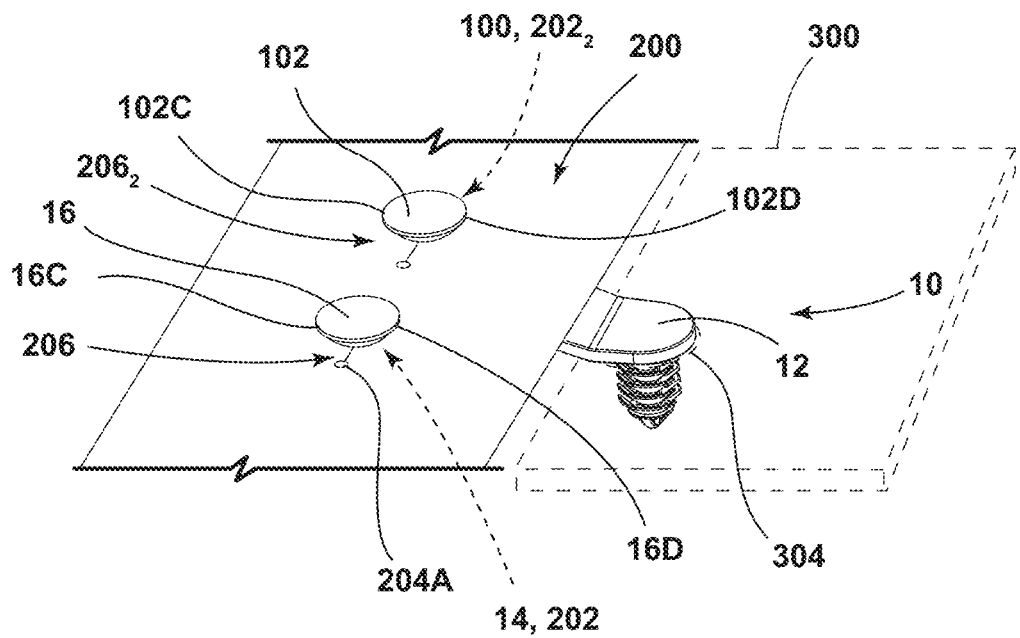
FIG. 14B is a partial perspective view generally illustrating an embodiment of a cable retainer connected to a flat cable according to teachings of the present disclosure.

In embodiments, such as generally illustrated in FIG. 14B, in an assembled configuration, the first portion 14 of the cable retainer 10 may be at least partially disposed within the first hole 202 of the flat cable 200, the third portion 100 of the cable retainer 10 may be partially disposed within the second hole $202_2$ of the flat cable 200, and/or the flat cable 200 may be partially disposed between the second and fourth portions 16, 102 and the base 12.

Figure 15:
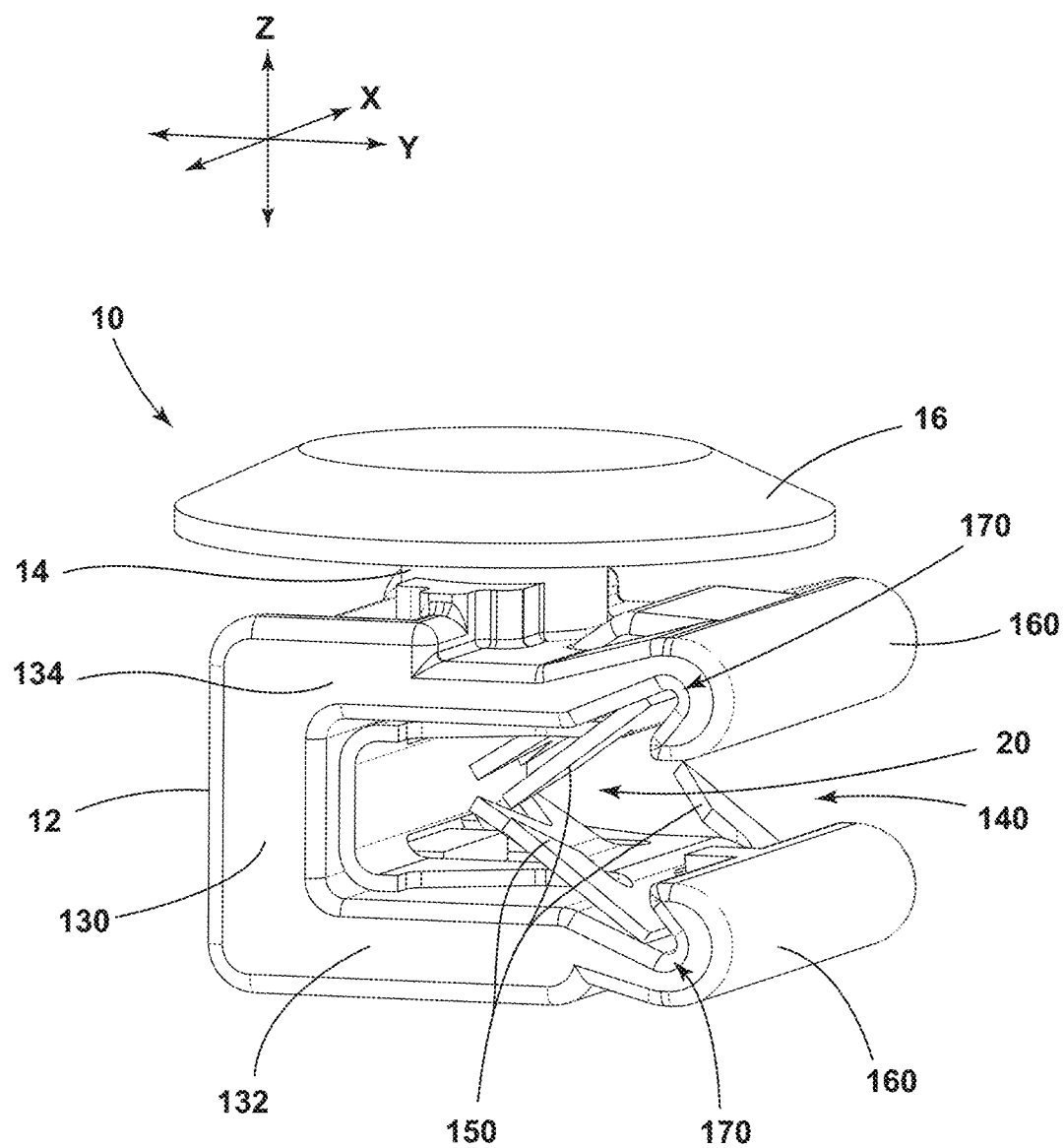
FIG. 15 is a perspective view generally illustrating an embodiment of a cable retainer according to teachings of the present disclosure.
Figure 16:
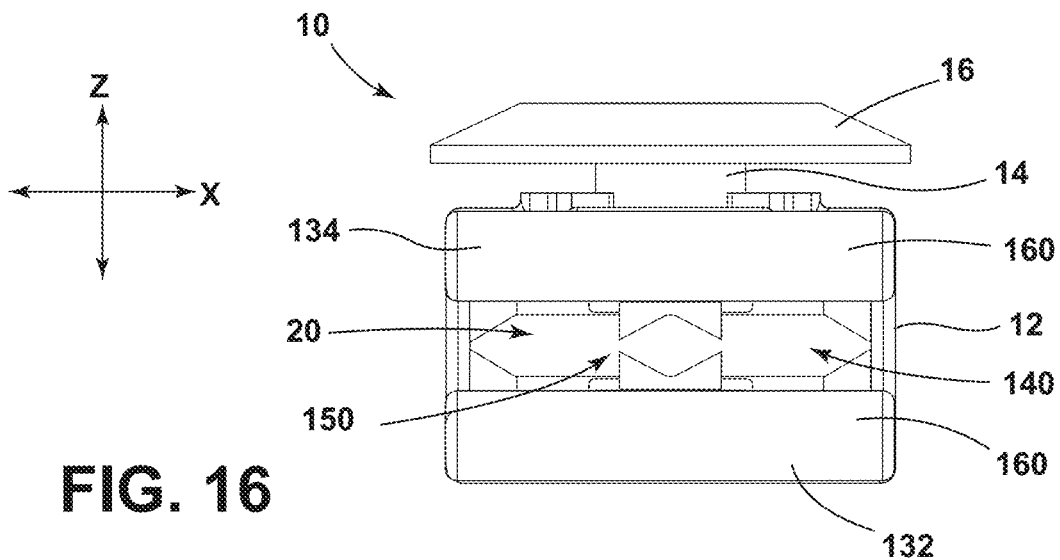
FIG. 16 is a front view generally illustrating an embodiment of a cable retainer according to teachings of the present disclosure.
Figure 17:
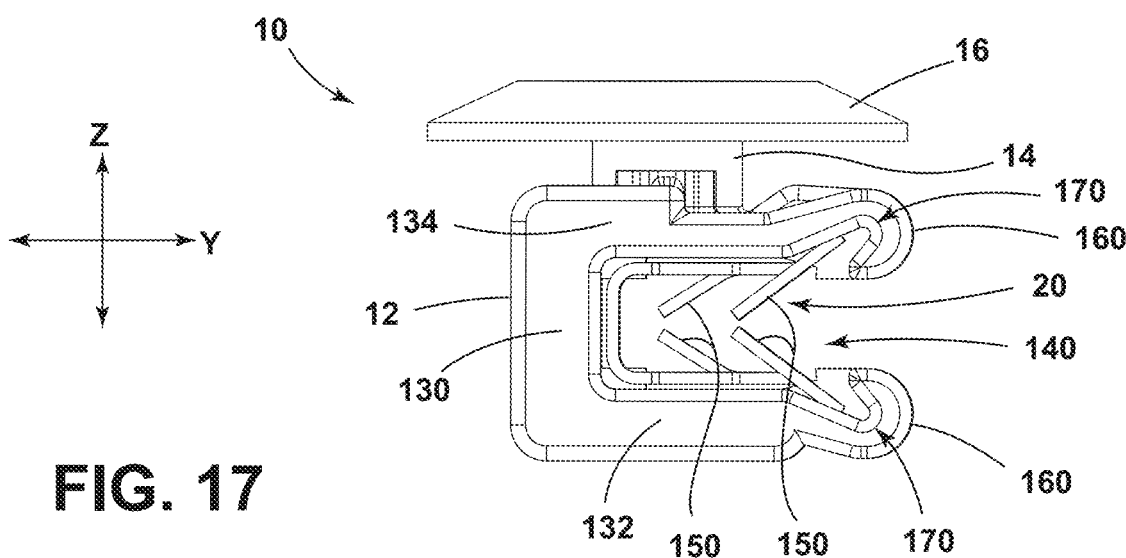
FIG. 17 is a side view generally illustrating an embodiment of a cable retainer according to teachings of the present disclosure.
Figure 18:
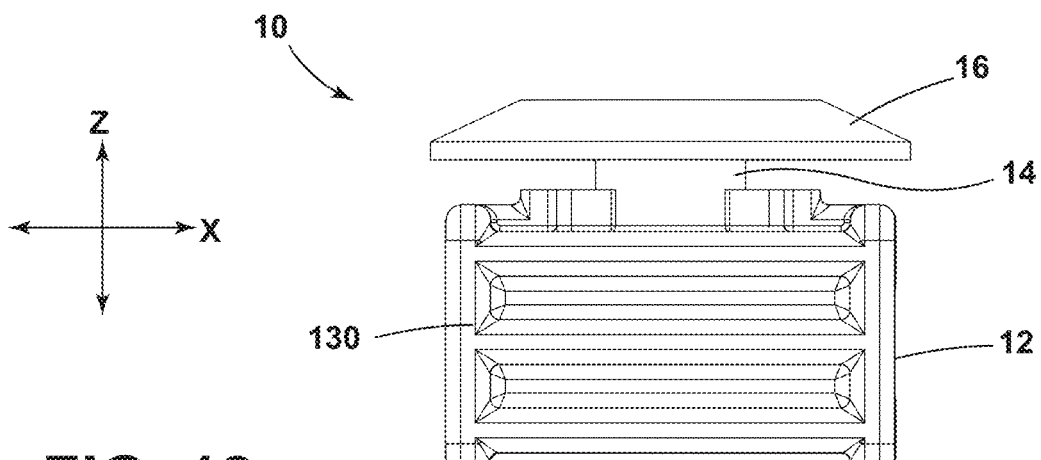
FIG. 18 is a back view generally illustrating an embodiment of a cable retainer according to teachings of the present disclosure.
Figure 19:
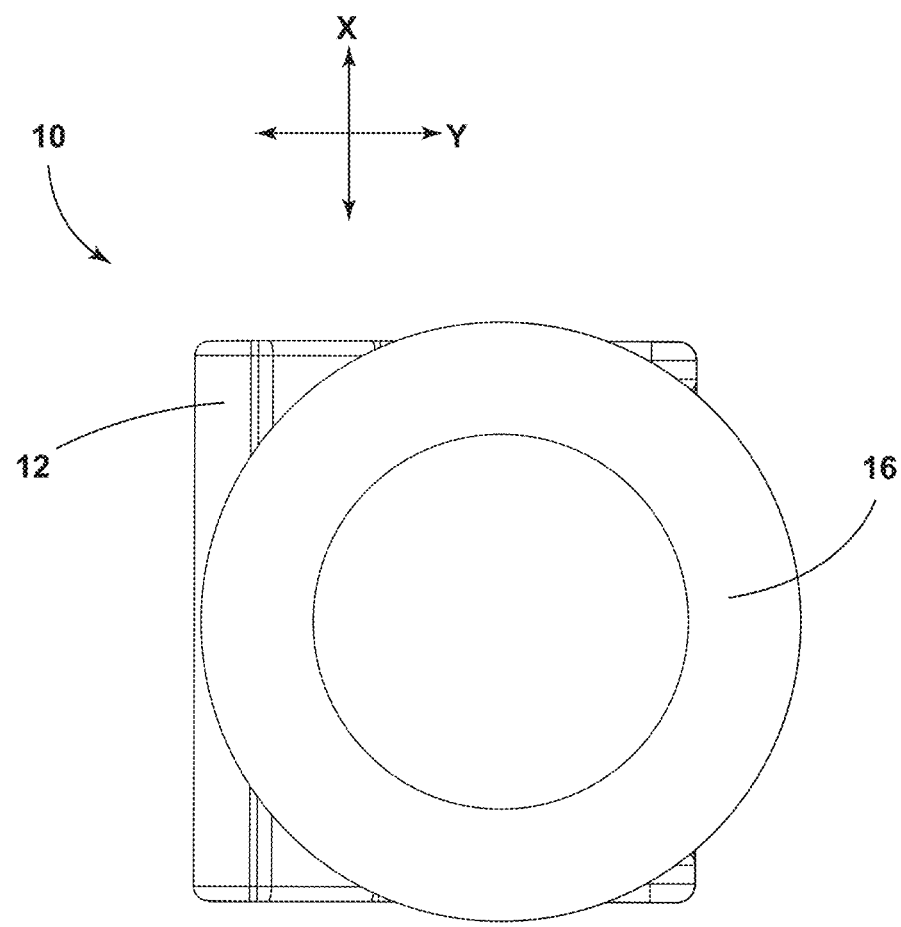
FIG. 19 is a top view generally illustrating an embodiment of a cable retainer according to teachings of the present disclosure.

With embodiments, such as generally illustrated in FIG. 15, a base 12 may include a first part 130, a second part 132, and/or a third part 134. In some example configurations, the second part 132 may extend from the first part 130. The third part 134 may extend from the first part 130 and/or may be spaced apart from the second part 132. For example and without limitation, the first part 130, the second part 132, and/or the third part 134 may be disposed in a C-shaped configuration.

Figure 20A:
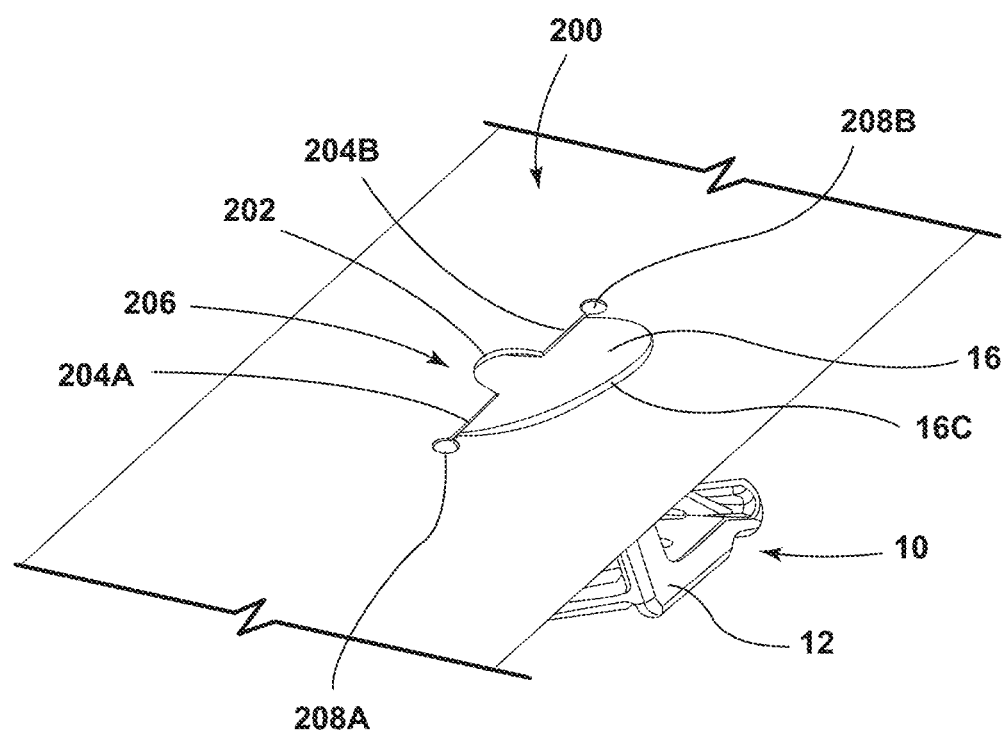
FIG. 20A is a partial perspective view generally illustrating an embodiment of a cable retainer being connected to a flat cable according to teachings of the present disclosure.

In embodiments, the first part 130, the second part 132, and/or the third part 134 of the base 12 may collectively define, at least in part, a receiving cavity 140. The receiving cavity 140 may be configured to receive and/or connect with a portion of an external object 300 (see, e.g., FIG. 20C).

With embodiments, at least a portion of the fastener 20 may be disposed in the receiving cavity 140. The fastener 20 may engage the first, second, and/or third parts 130, 132, 134 of the base 12. The fastener 20 may include a plurality of engagement projections 150. The engagement projections 150 may extend inward (e.g., toward a middle of the receiving cavity 140). The engagement projections 150 may be configured to engage and/or grip a portion of an external object 300 that is inserted into the receiving cavity 140 (see, e.g., FIG. 20C).

In embodiments, the fastener 20 may comprise one or more of a plurality of materials, such as a metal and/or a plastic material. The fastener 20 may, in some configurations, comprise a different material than other components (e.g., the base 12, the first portion 14, and/or the second portion 16, etc.) of the cable retainer 10. For example and without limitation, the fastener 20 may comprise a metal material, whereas the other components of the cable retainer 10 may comprise one or more plastic materials.

With embodiments, the second part 132 and/or the third part 134 of the base 12 may include arcuate end portions 160. In some examples, the arcuate end portions 160 may define voids 170 (see, e.g., FIGS. 15 and 17). Portions (e.g., end portions) of the engagement projections 150 may be disposed within the voids 170.

Figure 20B:
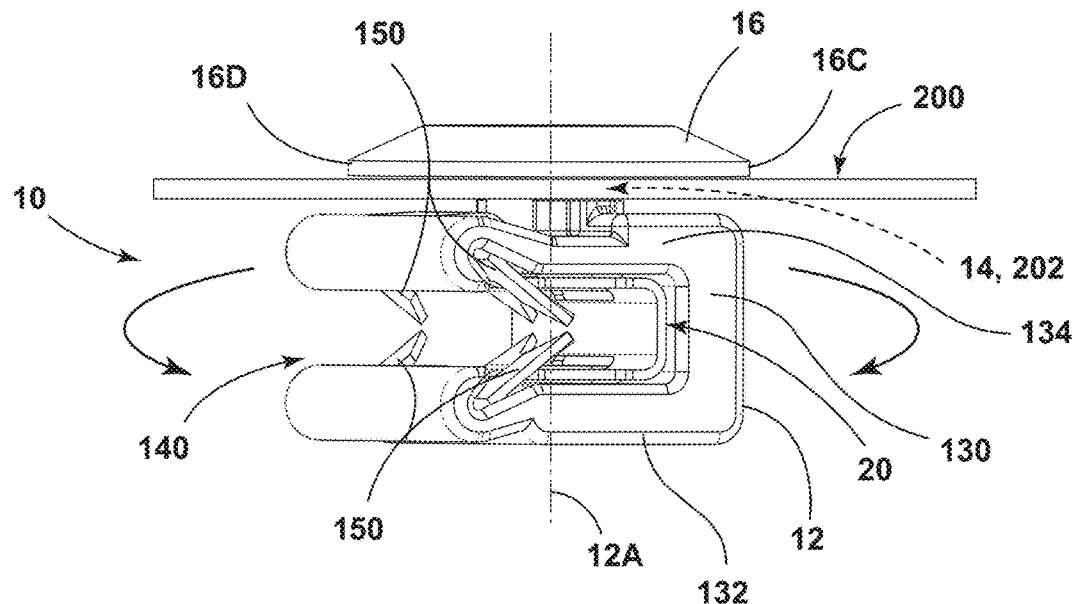
FIG. 20B is a partial perspective view generally illustrating an embodiment of a cable retainer being rotatably connected to a flat cable according to teachings of the present disclosure.
Figure 20C:
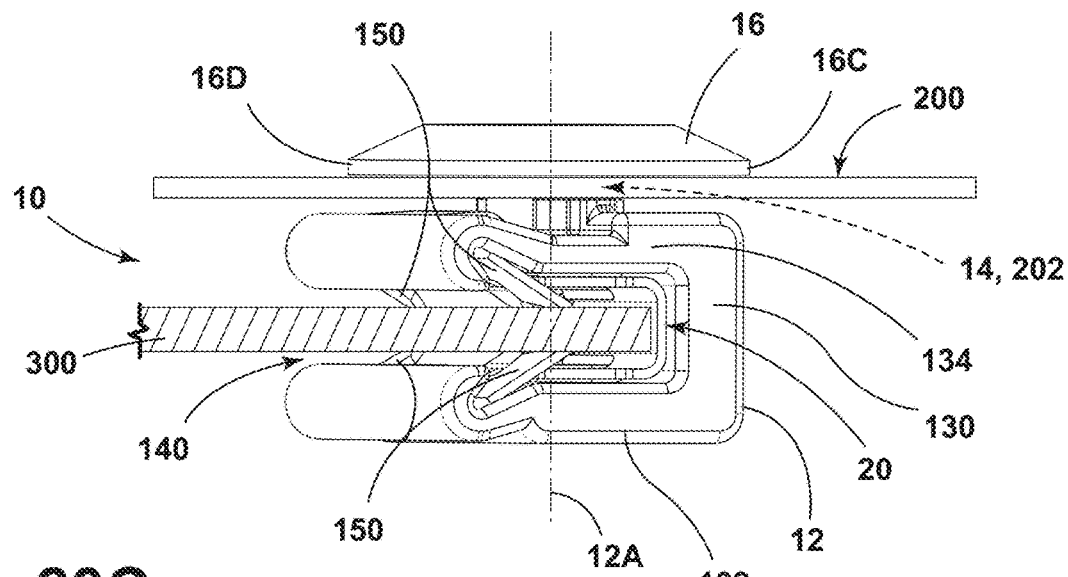
FIG. 20C is a partial perspective view generally illustrating an embodiment of a cable retainer connected to a flat cable and an external object according to teachings of the present disclosure.

In embodiments, such as generally illustrated in FIG. 20B, in an assembled configuration, the first portion 14 of the cable retainer 10 may be at least partially disposed within the hole 202 of the flat cable 200, and/or the flat cable 200 may be partially disposed between the second portion 16 and the third part 134 of the base 12. In some example configurations, when connected with the flat cable 200, the cable retainer 10 may be configured to rotate about an axis 12A. The cable retainer 10 may be configured to rotate to align the opening of the receiving cavity 140 with and receive a portion of an external object 300 (see, e.g., FIG. 20C).

Embodiments may include combinations of features illustrated in different drawings. For example and without limitation, parts 130-134 of a base 12 and a fastener 20 with a receiving cavity 140 and/or engagement projections 150 (e.g., FIG. 15) may be connected to and/or integrated with a second segment 92 of a base 12 (e.g., FIG. 8), such as instead of or in addition to projections 34, 36 and/or a cone portion 44.

Figure 21:
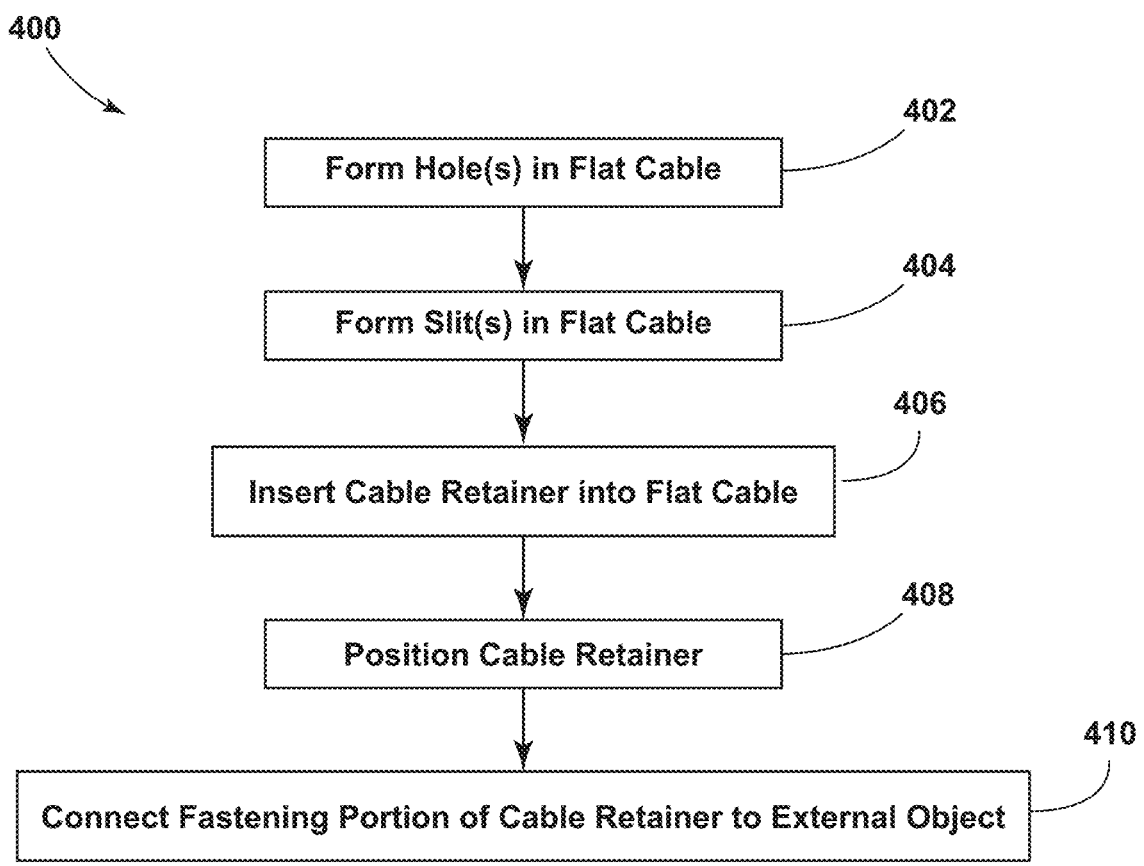
FIG. 21 is a flowchart generally illustrating an embodiment of a method of connecting a cable retainer.

With embodiments, such as generally illustrated in FIG. 21, a method 400 of connecting a cable retainer 10 may include forming at least one hole 202 (e.g., 202, 202$_2$) into a flat cable 200 (block 402).

In embodiments, the cable retainer 10 may include a base 12 having a fastener 20, a first portion 14 connected to the base 12 and having a first length 14L, and a second portion 16 connected to the first portion 14 and having a second length 16L that is greater than the first length 14L. The hole 202 may include a length 202L that is smaller than the second length 16L.

With embodiments, the method 400 may include forming a first slit 204A and/or a second slit 204B into the flat cable 200 for each respective hole 202 (block 404). The first slit 204A may extend from the hole 202 in a first direction 210. The second slit 204B may extend from the hole 202 in a second direction 212.

In embodiments, forming holes (block 402) may include forming additional holes 208A, 208B at distal ends of the first and second slits 204A, 204B. The additional holes 208A, 208B may be configured to limit or prevent damage to the cable 200, such as during the process of connecting the cable retainer 10 with the flat cable 200 and/or an external object 300.

With embodiments, the method 400 may include inserting an edge 16C of the second portion 16 into the opening 206 at an oblique or right angle relative to the flat cable 200 (step 406) (see, e.g., FIGS. 7A and 20A).

In some embodiments that include a cable retainer 10 having a third portion 100 and a fourth portion 102, the method 400 may include inserting an edge 102C of the fourth portion 102 in a second opening 206$_2$ while inserting the edge 16C of the second portion 16 into the opening 206 (see, e.g., FIG. 14A).

With embodiments, the method 400 may include positioning the cable retainer 10 (block 408), which may include inserting one or more second edges 16D, 102D through the opening 206, 206$_2$. Inserting the second edge 16D through the opening 206 may include rotating/tilting the cable retainer 10, such as about an axis that may be substantially parallel with a longitudinal direction of the flat cable 200 (e.g., an X-direction). Additionally or alternatively, block 408 may include positioning the cable retainer 10 such that a first portion 14 and/or a third portion 100 is at least partially disposed in hole 202, 202$_2$ and/or a portion of the flat cable 200 is disposed between the base 12 and the second portion 16 and/or a fourth portion 102 (see, e.g., FIGS. 11 and 14B).

In embodiments, positioning the cable retainer 10 (block 408) may include, while/after the edge 16C of the second portion 16 is inserted into the opening 206, applying a force to the flat cable 200 in a first direction 84 (e.g., a Y-direction) that is substantially perpendicular to a longitudinal direction of the flat cable 200 such that the opening 206 of the flat cable 200 is expanded (e.g., in a direction 84). While the opening 206 is expanded, an opposing edge 16D of the second portion 16 of the cable retainer 10 may be inserted into the opening 206 (see, e.g., FIG. 7A). After the opposing edge 16D of the second portion 16 is inserted into the opening 206, the cable retainer 10 may be moved, at least to some degree, in a second direction 86 that is opposite the first direction 84 such that the first portion 14 is partially disposed in the hole 202 (e.g., centered in the hole 202) and/or a portion of the flat cable 200 is disposed between the base 12 and the second portion 16 (see, e.g., FIG. 7B). If the cable retainer 10 includes a third portion 100 and/or a fourth portion 102 (or additional portions), a second opening 206$_2$ may be expanded in a similar manner to facilitate insertion of a second edge 102D through the opening 206$_2$.

With embodiments, the method 400 may include connecting the fastener 20 of the cable retainer 10 to an external object 300 (block 410), which may include connecting the flat cable 200 to the external object 300 via the cable retainer 10 (see, e.g., FIGS. 7B, 11, and 14B). In embodiments, connecting the fastener 20 to an external object 300 may include inserting at least a portion of the fastener 20 into a corresponding hole or other formation 304 of the external object 300 (see, e.g., FIG. 7B). In some examples, connecting the fastener 20 to the external object 300 may include rotating the first portion 14 of the cable retainer 10 in the opening 206 such that a receiving cavity 140 of the fastener 20 is aligned to connect with an external object 300 (see, e.g., FIG. 20B). After the fastener 20 is aligned to connect with an external object 300, a portion of the external object 300 may be inserted into the receiving cavity 140 (see, e.g., FIG. 20C) such that the cable retainer 10 is connected with the external object 300.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A cable retainer for connecting a flat cable to an external object, the cable retainer comprising:
  a base including a fastener, the fastener configured for connection with said external object, the fastener comprising:
    a first fastening section extending from a first side of the base, the first fastening section including a plurality of first projections spaced apart along the first side of the base, and
    a second fastening section extending from a second side of the base: the second fastening section including a plurality of second projections spaced apart along the second side of the base;
  a first portion connected to the base and having a first length;
  a second portion connected to the first portion, wherein each of the plurality of first projections and each of the plurality of second projections includes a surface parallel to an end surface of the second portion; and
  a first tapered track, a second tapered track, a third tapered track, and a fourth tapered track extending from the base facilitating connection between the fastener and said external object,
  wherein the third tapered track extends outwardly from a third side of the base and the fourth tapered track extends outwardly on a fourth side of the base, and
  wherein the first portion and the second portion at least partially define a recess configured to receive a portion of said flat cable: and the first tapered track and the second tapered track extend outwardly from the first side of the base and bracket at least portions of the plurality of first projections.

2. The cable retainer of claim 1, wherein:
  the base includes a first end, a second end spaced from the first end, a first side disposed between the first end and the second end, and a second side spaced from the first side;
  the first portion and the second portion are disposed proximate the first end of the base;
  the second end of the base includes a substantially planar surface;
  the first projections extend in a first direction and the second projections extend in a second direction;
  the second portion includes an end surface and a side surface that extends outwardly from the end surface; and
  the side surface extends at an acute angle relative to the end surface.

3. The cable retainer of claim 2, wherein the base includes a flange spaced apart from the second portion;
  the first portion is disposed between the second portion and the flange;
  the side surface of the second portion extends in a third direction and an outer surface of the flange extends in a fourth direction;
  the third and fourth directions intersect the first and second directions.

4. The cable retainer of claim 1, wherein:
  the base includes a first segment and a second segment that extends orthogonally from the first segment;
  the second segment includes a ramp portion and an end portion;
  the end portion is disposed at a terminal end of the second segment;
  the fastener extends from the end portion; and
  the ramp portion is disposed between the first segment and the end portion.

5. The cable retainer of claim 4, including a third portion connected to the base and having a third length that is substantially similar to the first length of the first portion; and
  a fourth portion connected to the third portion and having a fourth length that is substantially similar to a second length of the second portion.

6. The cable retainer of claim 5, wherein:
  the first portion and the third portion extend from the base in a first direction;
  the fastener extends from the base in a second direction that is opposite the first direction; and
  the first portion and the third portion are offset from fastener.

7. The cable retainer of claim 5, wherein the third portion is spaced apart from the first portion along the first segment of the base; and
  the second portion and the fourth portion each include an end surface and a side surface that extends inwardly relative to the end surface.

8. The cable retainer of claim 1, wherein the base includes a first part, a second part extending from the first part, and a third part extending from the first part and spaced apart from the second part; and
  the first part, the second part, and the third part collectively define a C-shape.

9. The cable retainer of claim 8, wherein the first part, the second part, and the third part collectively define a receiving cavity; and at least of a portion of the fastener is disposed within the receiving cavity.

10. The cable retainer of claim 9, wherein the second part and the third part of the base each include an arcuate end portion that defines a void.

11. The cable retainer of claim 10, wherein the fastener includes a plurality of engagement projections that extend in a direction into the receiving cavity; and portions of the engagement projections are disposed within the voids of the arcuate end portions.

* * * * *